Patented July 18, 1944

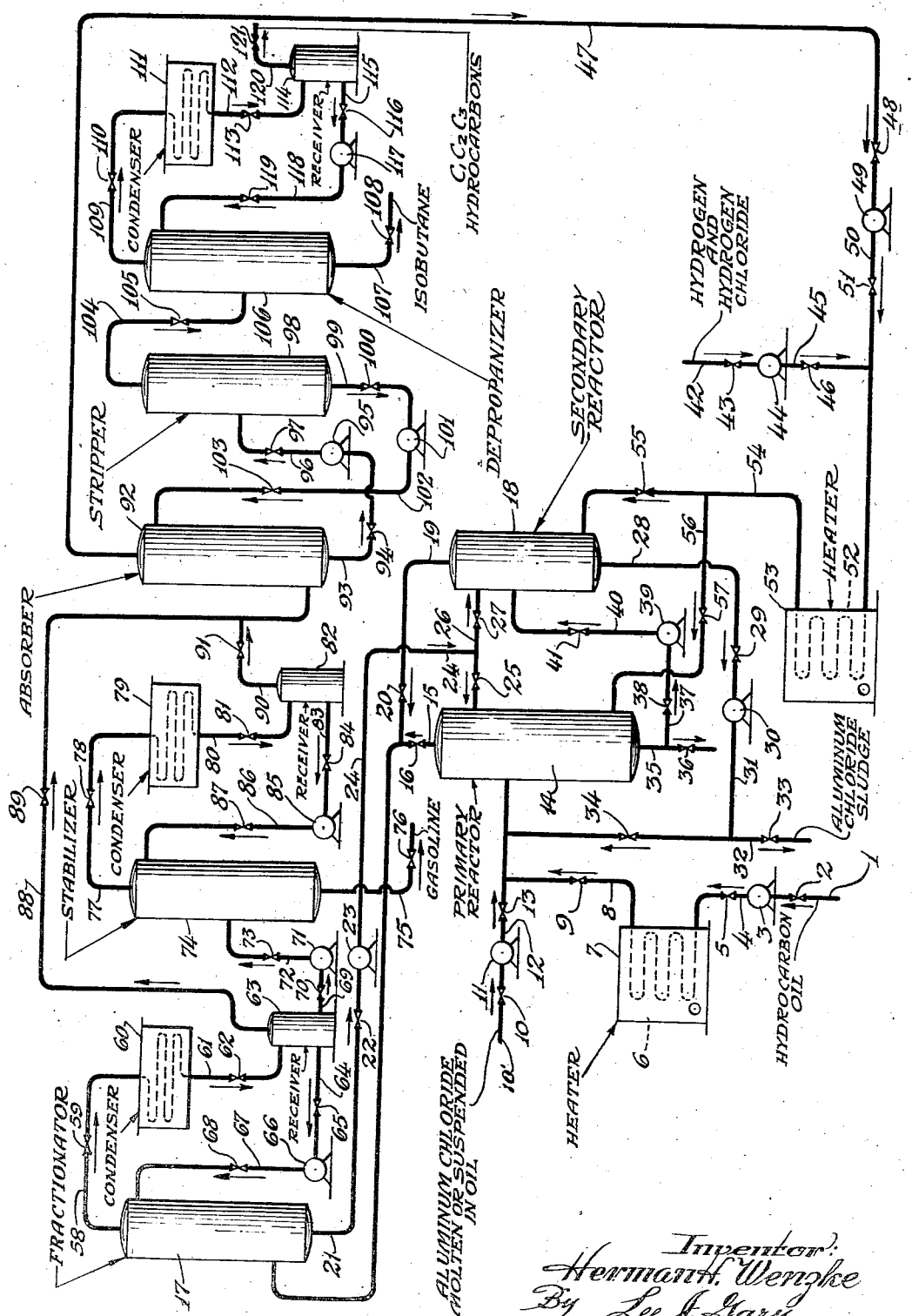

2,353,950

UNITED STATES PATENT OFFICE 2,353,950

TREATMENT OF HYDROCARBON OILS

Herman H. Wenzke, Chicago, Ill., assignor to Universal Oil Products Company, Chicago, Ill., a corporation of Delaware Application August 31, 1940, Serial No. 354,947

3 Claims. (Cl. 196—48)

This invention relates to the treatment of hydrocarbon oils with hydrogen in the presence of aluminum chloride and hydrogen chloride to produce therefrom substantial yields of isobutane and a substantially saturated motor fuel with a high content of isoparaffins.

The process is particularly applicable to the treatment of gas oil distillates obtained as intermediates in the distillation of crude oils but may also be applied to the treatment of other high boiling petroleum fractions. More particularly the process of this invention is concerned with the catalytic conversion of petroleum fractions boiling higher than gasoline by a continuous hydrogenation treatment in the presence of anhydrous aluminum chloride and hydrogen chloride to form high yields of isobutane, isopentane and higher boiling isoparaffins.

Isobutane has become a material of great importance to the oil industry as the result of processes of comparatively recent development which are effective in converting it to isoparaffins boiling within the range of gasoline and which are greatly in demand as fuels for airplane engines. The isobutane may be catalytically or thermally dehydrogenated to form isobutene which may be then polymerized to form branch chain octenes which readily hydrogenate to the corresponding iso-octanes. Isobutane may be alkylated with olefins either by thermal or catalytic processes to form isoparaffins boiling within the range of gasoline. Isobutene formed by the dehydrogenation of isobutane may also be used as a constituent in the manufacture of rubberlike products. The process of my invention is characterized by a number of advantageous features. When mixtures of hydrocarbon oils and anhydrous aluminum chloride are heated under cracking conditions the olefinic constituents produced form complexes with the catalyst which destroy its activity, resulting in excessive consumption of catalyst. One feature of my invention process is to heat the hydrocarbon oil in the absence of a catalyst to a temperature below that at which thermal cracking takes place, then to introduce this oil into an adiabatic reaction chamber wherein it is subjected to the action of hydrogen in the presence of anhydrous aluminum chloride and hydrogen chloride. Since the reaction is adiabatic, localized overheating from metallic surfaces is prevented.

In the operation of my process the heated hydrogen-containing gases are introduced at a temperature within the approximate limits of 600 and 1100° F. and thus supply a great portion of the heat necessary for vaporization within the reaction chambers. In addition to supplying heat for the reaction, the hydrogen enters into the reaction chemically. Since the process is operated primarily to produce a saturated product which is principally isoparaffinic in nature, extraneous hydrogen must be introduced to the system. Certain processes are in operation in which aluminum chloride cracking is conducted in such a manner that a portion of the charge is converted to coke, the coking reaction furnishing some of the hydrogen necessary to produce a saturated product. Such processes necessarily operate at a considerably higher consumption of catalyst than is true in the process of my invention. The hydrogen thus increases the life of the aluminum chloride catalyst and consequently decreases the amount used per unit quantity of product produced. Another advantage of the use of hydrogen is the agitation of the liquid layer in the reaction chambers. As the aluminum chloride tends to form heavy products during the reaction, the maximum utilization of the catalyst requires agitation of the mixture. The hydrogen thus performs a multiple function of agitating the mixture, supplying the heat to the process and reacting chemically with the hydrocarbons to form a saturated product and prolong the life of the catalyst.

Another essential feature of my invention is the use of anhydrous hydrogen chloride. This material exerts a pronounced catalytic effect, although the mechanism of this action is not known. It has been shown by experiment that when operating at a given set of conditions, such as temperature, contact time, proportion of aluminum chloride, that the use of hydrogen chloride increases the formation of gasoline boiling hydrocarbons to as much as 50 or 75%. The function of the hydrogen chloride is purely catalytic and in a continuous process it is necessary to add only small quantities to make up for the losses in the system. It has been found by experiment that the amount of hydrogen chloride consumed in the process has in some experiments varied within the approximate limits of ¼ to ½ pound per barrel of charging stock.

Another feature of my invention is the refluxing of the materials boiling above the gasoline range and the aluminum chloride vapors to the reaction zone. At the temperatures employed in my process, the aluminum chloride is highly volatile and provisions are made for its return to the reaction zone. The vapors leaving the reaction chambers contain appreciable quantities of hydrocarbons boiling above the motor fuel range and in order to obtain optimum yields, it is necessary that these be returned to the process. The presence of aluminum chloride in the fractionating equipment causes considerable mechanical difficulties and it is a feature of my process that substantially all of the aluminum chloride is condensed in the initial fractionator for the vapors leaving the reaction chambers.

In one specific embodiment my invention comprises a process for the production of a high octane substantially saturated motor fuel and isobutane comprising subjecting a hydrocarbon oil charging stock to the action of heated hydrogen in the presence of anhydrous aluminum chloride and hydrogen chloride in an adiabatic reaction zone in which a liquid level is maintained, said hydrogen and hydrogen chloride being introduced below the liquid level of the oil to agitate the liquid oil and to react said hydrogen with the oil, continuously removing from said reaction zone a vaporous fraction comprising gasoline and lower boiling products, and a liquid fraction containing the used catalyst in suspension, fractionating the aforesaid vaporous fraction to separate gasoline and low boiling products and a higher boiling liquid fraction containing condensed aluminum chloride vapors in suspension and returning said higher boiling liquid fraction with the condensed aluminum chloride to the reaction zone for further reacting.

The accompanying drawing illustrates diagrammatically in conventional manner means for carrying out a process flow of my invention and other features hereinafter set forth. It is not intended that my invention be limited to the particular apparatus or flow here presented except as set forth in the following claims.

Referring now to the drawing, charging stock for the process which may comprise a gas oil or, in general, any hydrocarbon oil boiling above the range of gasoline, is supplied to the system through line 1 and after passing through valve 2 enters pump 3 from which it is directed to line 4, valve 5 to heating coil 6. Heating coil 6 is so disposed as to receive heat from furnace 7. The heated oil is discharged from coil 6 at a temperature below that at which substantial thermal cracking takes place, as for example, 600 or 700° F. while the pressure may vary from about 150 to about 2000 pounds per square inch. The function of heating coil 6 is simply to preheat the charge to as high a temperature as possible without substantial thermal cracking. The heated oil leaves coil 6 by way of line 8 and after passing through valve 9 enters line 12 wherein it is commingled with anhydrous aluminum chloride supplied to the system in a molten state or suspended in oil by way of line 10' controlled by valve 10 from which it enters pump 11 discharging into line 12 controlled by valve 13. This mixture of aluminum chloride and oil may be commingled with a further quantity of recycle oil containing suspended catalyst and formed in a manner hereinafter set forth. The mixture of aluminum chloride is discharged into primary reactor 14, which in a small installation, may be the only reactor. Reactor 14 operates adiabatically and since no heat is transferred through its walls, the reactor may be lined with a non-corrosive insulating material. As the temperature of the material in this reactor is usually maintained within the approximate limits of 300 and 600° F., the reactor may be so constructed as to withstand the high pressures. The charge is kept in the reactor in the liquid state, the aluminum chloride and oil being kept thoroughly mixed by agitating with heated hydrogen and hydrogen chloride-containing gases. The pressure maintained in the reactor lies within the approximate limits of about 150–2000 pounds per square inch.

The extraneous hydrogen, together with hydrogen chloride needed to make up for losses, is introduced to heating coil 52 so disposed as to receive heat from furnace 53. The mixture of hydrogen and hydrogen chloride leaves heating coil 52 by way of line 54 at a temperature within the approximate limits of 600 and 1100° F. and a pressure within the approximate limits of 150–2000 pounds per square inch. When operating with both the primary and secondary reactors, a portion of this heated gas passes through valve 55 and enters secondary reactor 18, while the remainder, and greater portion, enters line 56 and after passing through valve 57 enters primary reactor 14. The proportions of hydrogen chloride and hydrogen used commonly lie within the ratio of 5 mols of hydrogen chloride to 95 of hydrogen and 25 mols of hydrogen chloride to 75 mols of hydrogen. As much as 50 mols of hydrogen chloride to 50 mols of hydrogen have been used, but satisfactory results may be obtained with the lesser quantities of hydrogen chloride indicated. It has been found by experiment that when less than 5 mols of hydrogen chloride for 95 mols of hydrogen are used that the rate of isomerization is appreciably lessened, requiring either a higher temperature in the reaction chamber or a greater time of contact or a higher reflux from the fractionator to the reaction zones or a proper combination of these factors. The quantity of aluminum chloride used in the feed varies from about ¼ to about ¾% by weight of the charging stock. When using a combination of two reactors, the primary reactor is operated such that 3 to 8 pounds of aluminum chloride are present per 100 pounds of oil while the secondary reactor operates with about 7 to 20 pounds of aluminum chloride present per 100 pounds of oil and at a temperature of from about 450 to 650° F.

A liquid fraction is continuously removed from reactor 14. This liquid fraction contains aluminum chloride in suspension and is removed by way of line 35 and either directed to a secondary reactor or, if only one reactor is used, is removed from the system by way of valve 36. The preferred method of operation is one using two reactors and in such cases the liquid fraction is removed from reactor 14 by way of line 35 and is directed to line 37 and after passing through valve 38 enters pump 39 discharging into line 40. After passing through valve 41, this oil with suspended aluminum chloride is supplied to secondary reactor 18. A liquid fraction is continuously removed from secondary reactor 18 by way of line 28 and after passing through valve 29 enters pump 30 discharging into line 31. This liquid fraction may be completely removed from the system by being directed through valve 33 located in line 32. It has been found that somewhat greater length of catalyst life or the equivalent, a lesser catalyst consumption, may be obtained by returning a portion of this liquid and suspended catalyst obtained from the secondary reactor to the primary reactor. Operating in this way a portion of this liquid fraction and suspended catalyst is directed through valve 34 into line 12 and commingled with the feed for the primary reactor. The vapors evolved from the primary and secondary reactors consist of unreacted hydrogen, hydrogen chloride, hydrocarbon vapors, and aluminum chloride. The vapors from the primary reactor enter line 15 and after passing through valve 16 are commingled with the vapors obtained from the secondary reactor by way of line 19 controlled by valve 20. This mixture of vapors is directed to fractionating column 17. Fractionating column 17 may be either a plate and bubble cap type column or a packed column. It has been found desirable, although not essential, to operate at least the lower portion of this column as a packed column with the upper portion operating as a plate and bubble cap type. Owing to the fact that the vapors leaving the reaction chambers contain a considerable quantity of aluminum chloride, difficulty will be encountered due to the clogging of the bubble caps as the aluminum chloride will be a solid in at least the upper portion of the column and a certain amount of sludge will always be found present. Fractionating column 17 serves to separate and reflux the hydrocarbon constituents boiling above the motor fuel range as well as to return aluminum chloride vapors leaving the reactors. Another function inherent in the operation of this fractionating column is the isomerization of some of the normal paraffinic constituents of the hydrocarbons to isoparaffins. This column operates with a sufficiently high reflux ratio that only a small portion of the aluminum chloride fails to be returned to the reactor. The higher boiling constituents separated in fractionator 17 including the suspended aluminum chloride are removed by way of line 21 controlled by valve 22 and enter pump 23 discharging into line 24. When the system operates with only the primary reactor 14, the entire contents of line 24 are directed through valve 25 into reactor 14. When operating with a secondary reactor, a portion of the stream in line 24 is directed to line 26 and after passing through valve 27 is supplied to the secondary reactor.

The overhead fraction from column 17 is removed by way of line 58 and after passing through valve 59 is supplied to cooler and condenser 60. The mixture of liquid and uncondensed and undissolved vapors leaving condenser 60 enters line 61 controlled by valve 62 and enters receiver and separator 63. A portion of the liquid collected in receiver 63 is returned to column 17 as reflux. This portion is removed from the receiver by way of line 64 and after passing through valve 65 enters pump 66 discharging into line 67 controlled by valve 68, after which it is directed to fractionating column 17. The remaining portion of the liquid collected in receiver 63 and which has the properties of an unstabilized gasoline is removed by way of line 69 and after passing through valve 70 enters pump 71 discharging into line 72 controlled by valve 73. After passing through valve 73 this liquid fraction enters stabilizing column 74 wherein a gasoline of the proper volatility is prepared. This stabilized gasoline is removed from column 74 by way of line 75 controlled by valve 76. Stabilizer overhead is removed by way of line 77 controlled by valve 78 and enters cooler and condenser 79. The mixture of liquid and uncondensed vapors leaving cooler and condenser 79 enters line 80 controlled by valve 81 and enters receiver and separator 82. The liquid fraction collected in receiver 82 is returned to the stabilizing column by way of line 83 controlled by valve 84, entering pump 85 which discharges into line 86 controlled by valve 87.

The gases collected in receiver 63 enter line 88 and after passing through valve 89 are commingled with the gases obtained from receiver 82 by way of line 90 controlled by valve 91. This gaseous mixture is then supplied to absorbing column 92 wherein it comes in contact with an absorption oil which dissolves the hydrocarbon constituents of this gaseous mixture. The hydrogen and hydrogen chloride remain substantially undissolved and are removed from the absorbing column by way of line 47 and after passing through valve 48 enter compressor 49 discharging into line 50 controlled by valve 51. After passing through valve 51, this recycle fraction of hydrogen and hydrogen chloride is commingled with an extraneous supply of hydrogen and hydrogen chloride obtained by way of line 45 controlled by valve 46.

The rich absorption liquid obtained from column 92 is removed by way of line 93 and after passing through valve 94 enters pump 95 discharging into line 96 controlled by valve 97. After passing through valve 97 this rich absorption liquid enters stripper 98 wherein the light hydrocarbon constituents are fractionated from the absorption oil. The lean absorption oil is removed from column 98 by way of line 99 and after passing through valve 100 enters pump 101 discharging into line 102 controlled by valve 103. After passing through valve 103 this lean absorption oil is returned to column 92 for further re-use.

The low boiling paraffins obtained as an overhead from stripper 98 are removed by way of line 104 and after passing through valve 105 enter column 106 which operates to remove propane and lower boiling hydrocarbons from the isobutane. The isobutane is removed from the bottom of column 106 by way of line 107 and after passing through valve 108 is collected as a product of the process. The lower boiling hydrocarbons obtained as an overhead in depropanizer 106 enter line 109 and after passing through valve 110 enter cooler and condenser 111. The mixture of liquid and vapors leaving cooling coil 111 enters line 112 controlled by valve 113 from which they enter receiver and separator 114. The liquid collected in receiver and separator 114 is removed by way of line 115 and after passing through valve 116 enters pump 117 discharging into line 118 controlled by valve 119. After passing through valve 119 this liquid is returned to column 106 to serve as a reflux. The gaseous fraction obtained in receiver 114 consists of $C_1$, $C_2$, and $C_3$ hydrocarbons and is removed by way of line 120 and after passing through valve 121 is removed as a product of the process.

The following example illustrates the yield of the principal products in the normal operation of the process. While the data are characteristic they are not introduced with the intent of unduly limiting the proper scope of the invention. A Pennsylvania gas oil of 37.1 A. P. I. gravity and following Engler distillation was used as charging stock:

| | |
|---|---|
| I. B. P. | 432 |
| 5% | 472 |
| 10 | 500 |
| 20 | 543 |
| 30 | 581 |
| 50 | 626 |
| 70 | 661 |
| 90 | 720 |
| E. P. | 760 |
| Per cent over | 99.0 |
| Per cent bottoms+coke | 1.0 |

The first reactor is operated at a temperature of 450° F. and the second reactor at a temperature of 575° F. The quantity of aluminum chloride used is equal to ½% by weight of the charging stock. The proportions of hydrogen chloride and hydrogen in the heated gas bubbled through the hydrocarbon oil is equal to 20 mols of hydrogen chloride to 80 mols of hydrogen. The pressure used on the reaction chambers was approximately 1000 pounds per square inch, the gases being heated to a temperature of about 975° F. before being injected into the reactors. A yield of 62% of 300° F. end point gasoline of a 79 octane number by the C. F. R. motor method may be obtained. This gasoline will have a bromine number less than 3. The quantity of liquid isobutane obtainable is equivalent to 16% by volume of the charge. The above results are obtainable when operating so as to have a 4% liquid residue. In the above experiments the ratio of aluminum chloride to hydrocarbon oil present in the first reactor was equal to 6 pounds of oil per pound of aluminum chloride while the second reactor is operated with 8 pounds of oil per pound of aluminum chloride.

I claim as my invention:

1. A process for the production of a high octane substantially saturated motor fuel and isobutane comprising subjecting a hydrocarbon oil charging stock to the action of heated hydrogen in the presence of anhydrous aluminum chloride and hydrogen chloride in a primary adiabatic reactor, said heated hydrogen being introduced below the liquid level of said oil, continuously removing from said primary reaction chamber a vaporous fraction and a liquid fraction containing the catalyst in suspension, charging said liquid fraction to a secondary adiabatic reaction chamber for further reacting with heated hydrogen in the presence of anhydrous aluminum chloride and hydrogen chloride, continuously removing from said second reaction chamber a vaporous fraction and a liquid fraction containing the catalyst in suspension, returning a portion of said liquid fraction and suspended catalyst to the primary reaction chamber and removing the remainder from the system, fractionating the vapors of the two reaction chambers to separate a fraction comprising gasoline and lower boiling products and a higher boiling liquid fraction containing the condensed aluminum chloride vapors in suspension and returning said higher boiling fraction with suspended aluminum chloride to the reaction zones for further reacting.

2. A process for the production of a high octane substantially saturated motor fuel and isobutane comprising subjecting a hydrocarbon oil charging stock to the action of heated hydrogen and hydrogen chloride-containing gases in the presence of anhydrous aluminum chloride in a primary reaction chamber, said heated gases being introduced below the liquid level of said oil, continuously removing from said primary reaction chamber a vaporous fraction and a liquid fraction containing the catalyst in suspension, charging said liquid fraction to a secondary adiabatic reaction chamber for further reacting with heated hydrogen and hydrogen chloride-containing gases, said heated gases being introduced below the liquid level of said oil, continuously removing from said second reaction chamber a vaporous fraction and a liquid fraction containing the catalyst in suspension, returning a portion of said liquid fraction and suspended catalyst to the primary reaction chamber and removing the remainder from the system, fractionating the vapors from the two reaction chambers to separate a liquid reflux comprising constituents boiling above the motor fuel boiling range and containing condensed aluminum chloride vapors in suspension, returning said reflux and suspended aluminum chloride to the reaction zones, fractionating the remainder of the vapors of the reaction chambers to separate a motor fuel, isobutane, and a gaseous fraction containing hydrogen and hydrogen chloride, commingling said gaseous fraction with extraneous hydrogen and hydrogen chloride and heating said gaseous mixture to a temperature at least equal to the reaction temperature and introducing it to the reaction chambers for reacting as hereinbefore set forth.

3. A hydrocarbon conversion process which comprises introducing a heated hydrocarbon oil having aluminum chloride suspended therein into a primary reaction zone and therein effecting conversion, simultaneously heating a gaseous stream comprising hydrogen and hydrogen chloride to at least the conversion temperature of said oil, introducing at least a portion of the thus heated stream to said primary reaction zone below the liquid level of the oil and catalyst mixture, supplying resultant liquid conversion products to a secondary reaction zone and therein continuing conversion in the presence of another portion of the heated stream introduced to the secondary reaction zone below the liquid oil level, and supplying at least a portion of the resultant liquid conversion products formed in said secondary reaction zone to said primary reaction zone.

HERMAN H. WENZKE.